US009998989B2

(12) United States Patent
Huang et al.

(10) Patent No.: US 9,998,989 B2
(45) Date of Patent: Jun. 12, 2018

(54) WAKEUP METHOD FOR DEVICES IN POWER SAVING MODE

(71) Applicant: Verizon Patent and Licensing Inc., Arlington, VA (US)

(72) Inventors: Ye Huang, San Ramon, CA (US); Lei Song, Fremont, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 191 days.

(21) Appl. No.: 14/795,235

(22) Filed: Jul. 9, 2015

(65) Prior Publication Data

US 2017/0013553 A1    Jan. 12, 2017

(51) Int. Cl.
*H04W 52/02*   (2009.01)
*H04W 8/04*    (2009.01)
*H04W 48/08*   (2009.01)
*H04W 40/24*   (2009.01)

(52) U.S. Cl.
CPC ......... *H04W 52/0209* (2013.01); *H04W 8/04* (2013.01); *H04W 48/08* (2013.01); *H04W 40/244* (2013.01); *Y02D 70/00* (2018.01); *Y02D 70/1224* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/26* (2018.01)

(58) Field of Classification Search
None
See application file for complete search history.

(56) References Cited

U.S. PATENT DOCUMENTS

| 7,010,024 | B1 * | 3/2006 | Eerola | H04B 1/7093 375/150 |
| 7,129,888 | B1 * | 10/2006 | Chesley | G01S 7/2813 342/159 |
| 9,107,164 | B1 * | 8/2015 | Troyanker | H04W 52/0229 |
| 9,491,024 | B2 * | 11/2016 | Zhang | H04L 27/2659 |
| 2006/0176837 | A1 * | 8/2006 | Son | H04B 1/70712 370/311 |
| 2012/0321007 | A1 * | 12/2012 | Feher | H04W 64/00 375/261 |

(Continued)

*Primary Examiner* — Chirag Shah
*Assistant Examiner* — Amar Persaud

(57) ABSTRACT

A wireless communication device may include a baseband processing unit comprising a wakeup detector configured to receive a wireless signature beacon signal; determine that the received wireless signature beacon signal matches the selected wakeup signature beacon signal; and generate a wake up signal, in response to determining that the received wireless signature beacon signal matches the selected wakeup signature beacon signal. The wireless communication device may further include an application processing unit comprising a power manager configured to cause the wireless communication device to enter a power saving mode; receive the wake up signal from the wakeup detector; and perform a wakeup process, in response to receiving the wakeup signal wherein the wakeup process causes the wireless communication device to exit the power saving mode.

14 Claims, 11 Drawing Sheets

(56) References Cited

U.S. PATENT DOCUMENTS

| | | | |
|---|---|---|---|
| 2014/0269462 A1* | 9/2014 | Jia | H04W 52/0229 370/311 |
| 2014/0344604 A1* | 11/2014 | Paljug | G06F 1/3209 713/323 |
| 2015/0003348 A1* | 1/2015 | Ishii | H04L 27/2601 370/329 |
| 2015/0003575 A1* | 1/2015 | Mallinson | H03H 17/0286 375/371 |
| 2015/0028838 A1* | 1/2015 | Kang | H02M 5/293 323/299 |
| 2015/0117285 A1* | 4/2015 | Xie | H04W 52/0216 370/311 |
| 2015/0319172 A1* | 11/2015 | Zhang | H04L 63/065 713/169 |
| 2016/0373237 A1* | 12/2016 | Shellhammer | H04L 7/0012 |
| 2017/0013553 A1* | 1/2017 | Huang | H04W 48/08 |

* cited by examiner

Plot of a Zadoff-Chu sequence for u = 7, N = 353

WAKEUP METHOD FOR DEVICES IN POWER SAVING MODE

BACKGROUND INFORMATION

Many electronic devices require low power consumption in order to keep the device operational for long periods of time without having to recharge the battery. As an example, wireless devices that are mounted in a hard to reach location may be powered by a battery that is supposed to last for one to two years. As another example, a medical device carried on person by a patient and powered by a battery may have a battery life requirement of two years or more to meet Federal Communications Commission (FCC) requirements. In order to increase battery life, a device may enter a power saving mode when the device is idle and not performing functions that require higher power consumption. The device may be scheduled to wake up and exit the power saving mode at particular intervals to determine whether the device needs to communicate with another device, such as to report data, receive instructions, perform an update, and/or execute another type of action. Thus, when another device attempts to reach a device that is in a power saving mode, the other device may need to wait until a scheduled wake up event occurs. Furthermore, if no communication is required, the device may unnecessarily exit the power saving mode at scheduled intervals, thereby shortening the battery life.

DETAILED DESCRIPTION OF PREFERRED EMBODIMENTS

Figure 1:
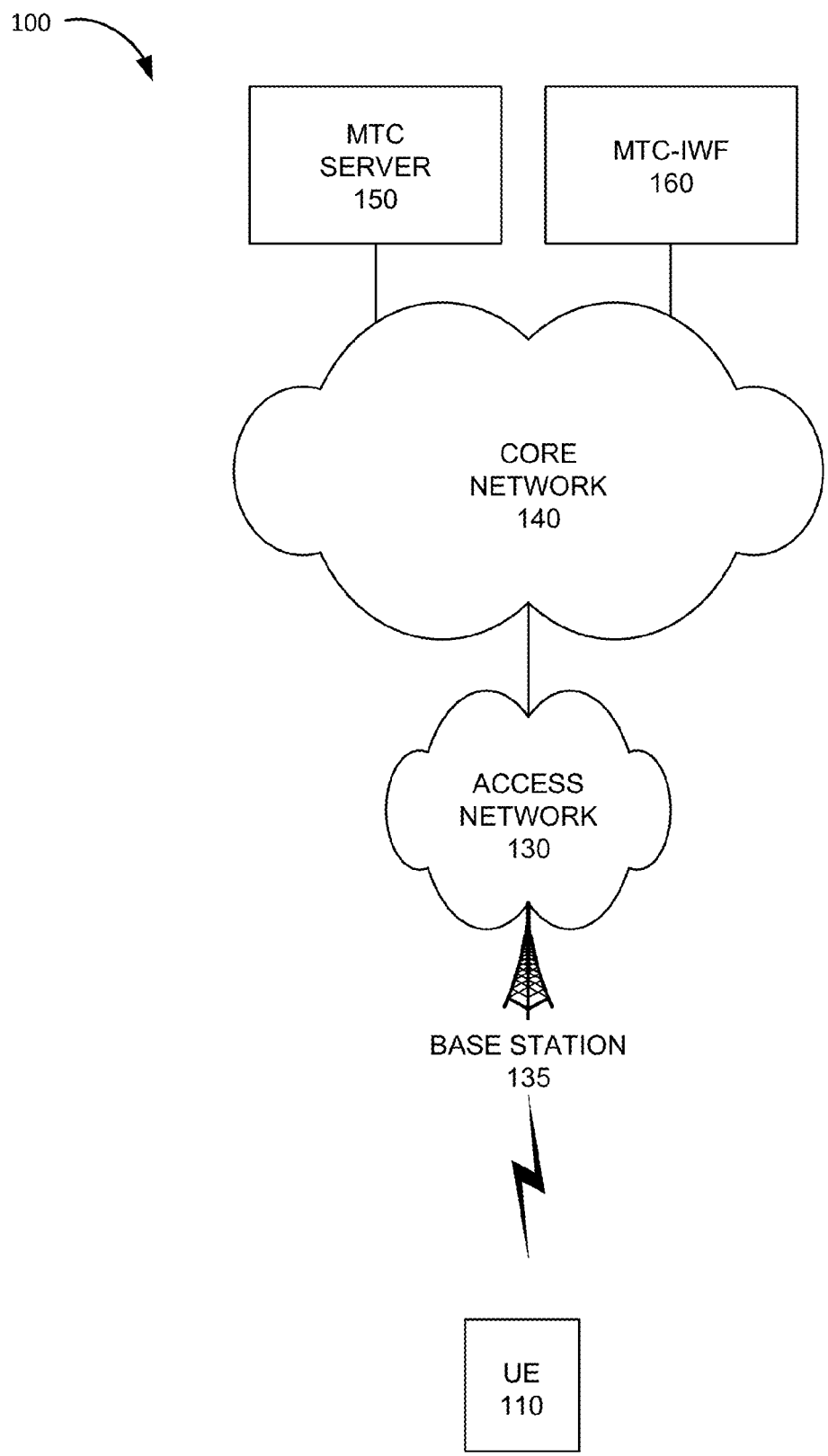
FIG. 1 is a diagram illustrating an environment according to an implementation described herein.

The following detailed description refers to the accompanying drawings. The same reference numbers in different drawings identify the same or similar elements.

A wireless communication device, also referred to herein as a user equipment (UE), may be configured for machine-type communication (MTC), a type of machine-to-machine (M2M) communication standardized by the $3^{rd}$ Generation Partnership Project (3GPP). Two devices may communicate via MTC using wireless signals without requiring user participation. A UE configured for MTC may enter a power saving mode in order to increase battery life whenever the UE is not communicating or performing operations with higher power requirements.

Implementations described herein relate to a wakeup method for devices in a power saving mode. A UE configured for MTC may subscribe to a wireless signature beacon trigger. The wireless signature beacon trigger may be used to wake up the UE from a power saving mode when another device selects to communicate with the UE. Different groups of UEs may be configured to detect different signature beacons. A signature beacon may be configured for a UE during provisioning or during signal exchanges with a wireless access network or an MTC server device associated with the UE. A wireless access network may enable an MTC server device to wake up a UE in power saving mode using the wireless signature beacon signal.

A wireless signature beacon signal may be associated with a group identifier (ID), a trigger type identifier, a priority type identifier, and/or other types of identifiers. For example, particular group ID, trigger type ID, and/or priority type ID may be mapped to a particular wireless signature beacon signal.

The wireless signature beacon signal may be transmitted using a Direct Current (DC) subcarrier of a frequency band used by the UE for receiving wireless signals. The UE may include a wakeup detector module that will trigger the UE to wake up and exit the power saving mode in response to detecting the wireless signature beacon signal. The wakeup detector module may include a set of matched filters and a matched filter selector to select a particular matched filter. Each matched filter may be configured to detect a particular signature beacon. For example, each matched filter may be configured to detect a particular waveform sequence from a set of sequences with good auto-correlation and/or cross-correlation properties, such as a set of constant amplitude zero autocorrelation waveforms. For example, in some implementations, each matched filter may be configured to detect a Zadoff-Chu sequence with a different set of constants.

The set of matched filters may be implemented, for example, in a baseband processor of the UE. When the matched filter output exceeds a particular threshold, a wakeup signal may be generated and sent to a power manager. The power manager may be implemented, for example, in an application processor of the UE. Keeping a matched filter circuit active in the baseband processor may use a small amount of power in comparison to having the UE exit the power saving mode at particular intervals to communicate with a remote device to check for updates or instructions.

Thus, the UE may select a wakeup signature beacon signal and enter a power saving mode. At a later time, the UE may receive a wireless signature beacon signal, may determine that the received wireless signature beacon signal matches the selected wakeup signature beacon signal, and may perform a wakeup process that causes the UE to exit the power saving mode, in response to determining that the received wireless signature beacon signal matches the selected wakeup signature beacon signal.

Different signature beacons may be associated with different wake up signals. For example, a first signature beacon may be selected for a first trigger type and a second signature beacon may be selected for a second trigger type. The UE may determine a trigger type based on a detected signature beacon and may select a particular wakeup process based on the determined trigger type, such as, for example, a wakeup process to exit the power saving mode immediately, exit the power saving mode at a scheduled time in the future, attach to a wireless access network, contact a server device to request instructions, report a particular metric to the server device, and/or perform another type of action in response to the detected signature beacon.

Furthermore, implementations described herein relate to a system architecture to deliver a wireless signature beacon to a UE to wake up the UE. An MTC server device may be configured to communicate with the UE and to send a wakeup signal to the UE when the MTC server device needs to communicate with the UE. The MTC server device may communicate with a wireless access system associated with the UE via an MTC Interworking Function (MTC-IWF) device. The wireless access system may include a Long Term Evolution (LTE) wireless access network. The MTC-IWF device may be configured to implement control plane signaling with devices of the wireless access network, such as a Mobility Management Entity (MME) device, a Home Subscriber Server (HSS) device, and/or another type of device.

The wireless access network may receive a wakeup request from the MTC-IWF device, identify the UE associated with the wakeup request, map the received wakeup request to a wakeup signature beacon signal based on the identified UE, generate the wakeup signature beacon signal, and transmit the generated wakeup signature beacon signal. An HSS of the wireless access network may be configured to store a profile for the UE that includes a wakeup request identifier and to identify the UE based on the received wakeup request including the wakeup request identifier. An MME of the wireless access network may be configured to map the received wakeup request to the wakeup signature beacon signal based on the identified wireless communication device. A base station of the wireless access network, such as an eNodeB, may be configured to generate the wakeup signature beacon signal and transmit the generated wakeup signature beacon signal.

FIG. 1 is a diagram of an exemplary environment 100 in which the systems and/or methods, described herein, may be implemented. As shown in FIG. 1, environment 100 may include a UE 110, an access network 130, a core network 140, an MTC server 150, and an MTC-IWF device 160.

UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE 110 may correspond to an embedded wireless device that communicates wirelessly with other devices over a machine-to-machine interface. For example, UE 110 may be electrically connected to any electronic device with a microcontroller, such as a microcontroller controlling one or more actuators, a microcontroller controlling one or more sensors, a microcontroller that performs data processing, and/or another type of microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. UE 110 may include a Subscriber Identity Module (SIM) card (not shown in FIG. 1). The SIM card may store information for one or more subscriptions that may be activated for UE 110. UE 110 may wirelessly communicate with access network 130.

Access network 130 may provide access to core network 140 for wireless devices, such as UE 110. Access network 130 may enable UE 110 to provide mobile telephone service and/or data services to UE 110. Access network 130 may include a base station 135 and UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computational or communication devices. In one example implementation, core network 140 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

MTC server 150 may include one or more devices, such as computer devices and/or server devices, which communicate with UE 110. MTC server 150 may generate a wakeup signal to wake up UE 110 and may send the wake up signal to MTC-IWF 160. After UE 110 has woken up, MTC server 150 may communicate with UE 110 to provide instructions to UE 110 and/or to receive information from UE 110. As an example, if UE 110 corresponds to a mobile communication device with an installed application, MTC server 150 may correspond to a server device associated with the installed application. As another example, if UE 110 corresponds to a utility meter, MTC server 150 may correspond to a utility server device that collects meter readings from the utility meter. As yet another example, if UE 110 corresponds to a personal medical device, MTC server 150 may correspond to a server device that monitor's a user's vital signs.

MTC-IWF device 160 may include one or more devices, such as computer devices and/or server devices, which function as an interface device between MTC server 150 and access network 130. For example, MTC-IWF device 160 may implement a control plane interface with elements of access network 130 and may generate a request message, such as a request to authentication UE 110 and/or a request to wake up UE 110, to a particular element of access network 130 based on a request received from MTC server 150. MTC-IWF device 160 may receive an indication from access network 130 that UE 110 has woken up and is ready for communicating with MTC server 150 and may inform MTC server 150 that UE 110 has woken up and is ready for communication.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
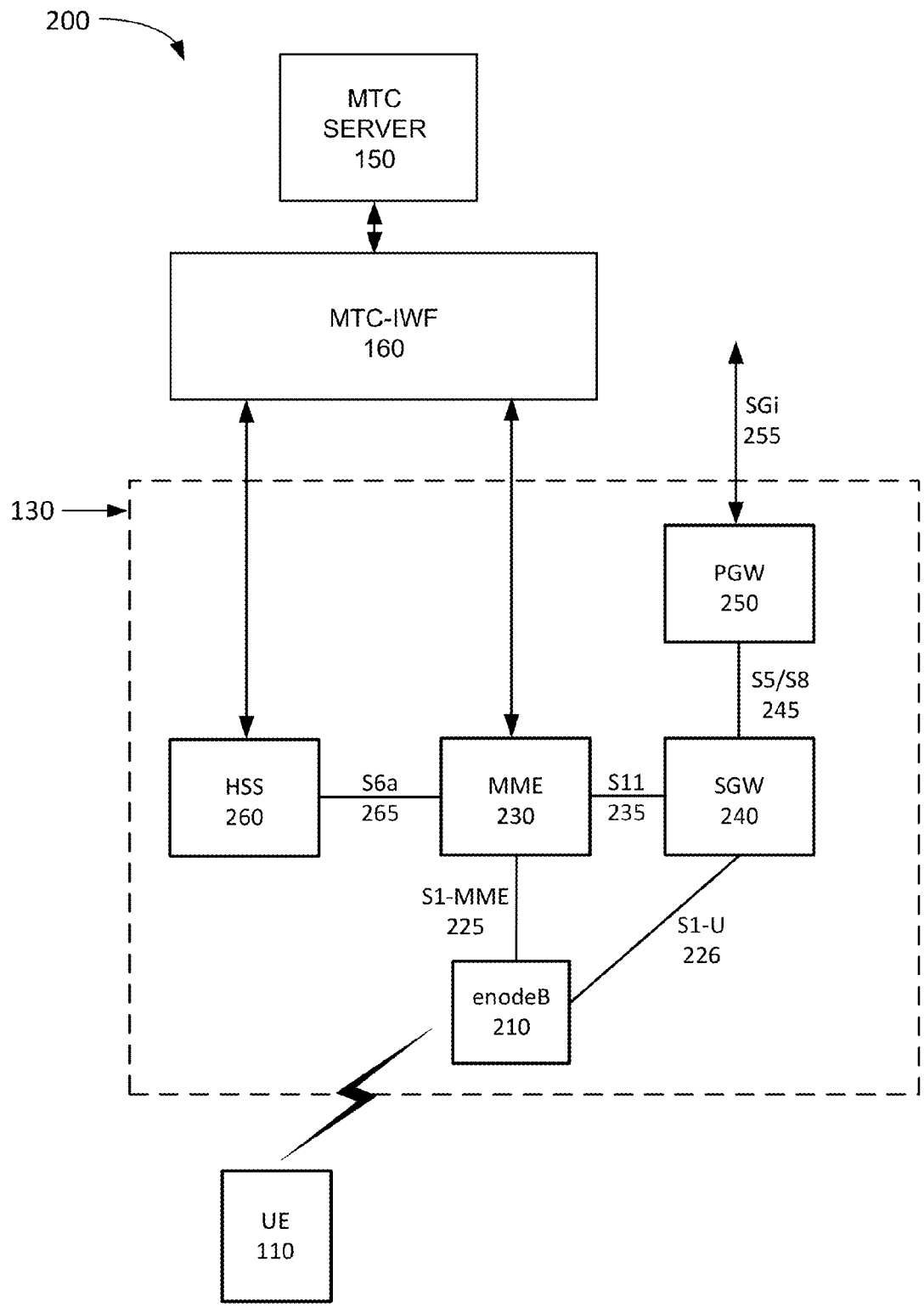
FIG. 2 is a diagram illustrating exemplary components of the access network of FIG. 1.

FIG. 2 is a diagram illustrating example components of a system 200 that includes access network 130 according to an implementation described herein. As shown in FIG. 2, system 200 may include access network 130, MTC server 150, and MTC-IWF device 160. Access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) 230, a serving gateway (SGW) 240, a packet data network gateway (PGW) 250, and a home subscriber server (HSS) 260. While FIG. 2 depicts a single eNodeB 210, MME 230, SGW 240, PGW 250, and HSS 260 for illustration purposes, in other implementations FIG. 2 may include multiple eNodeBs 210, MME 230, SGWs 240, PGWs 250, and/or HSS 260.

eNodeB 210 may include one or more devices (e.g., base stations) and other components and functionality that allow UE 110 to wirelessly connect to access network 130. eNodeB 210 may interface with access network 130 via an interface referred to as an S1 interface, which may be split into a control plane S1-MME interface 225 and a data place S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME 230 may implement control plane processing for access network 130. For example, MME 230 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME 230 may also select a particular SGW 240 for a particular UE 110. A particular MME 230 may interface with other MME 230 in access network 130 and may send and receive information associated with UEs, which may allow one MME device to take over control plane processing of UEs serviced by another MME, if the other MME becomes unavailable.

SGW 240 may provide an access point to and from UE 110, may handle forwarding of data packets for UE 110, and may act as a local anchor point during handover procedures between eNodeBs 210. SGW 240 may interface with PGW 250 through an S5/S8 interface 245. S5/S8 interface 245 may be implemented, for example, using GTPv2.

PGW 250 may function as a gateway to core network 140 through an SGi interface 155. Core network 140 may include, for example, an IMS network, which may provide voice and multimedia services to UE 110, based on Session Initiation Protocol (SIP). A particular UE 110, while connected to a single SGW 240, may be connected to multiple PGWs 250, one for each packet network with which UE 110 communicates.

MME 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME 230 needs to communicate with SGW 240, such as when the particular UE 110 attaches to access network 130, when bearers need to be added or modified for an existing session for the particular UE 110, when a connection to a new PGW 250 needs to be created, or during a handover procedure (e.g., when the particular UE 110 needs to switch to a different SGW 240).

HSS 260 may store information associated with UEs 110 and/or information associated with users of UEs 110. For example, HSS 260 may store user profiles that include authentication and access authorization information. HSS 260 may store subscription status information for SIM cards 120. MME 230 may communicate with HSS 260 through an S6a interface 265. S6a interface 265 may be implemented, for example, using a Diameter protocol.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
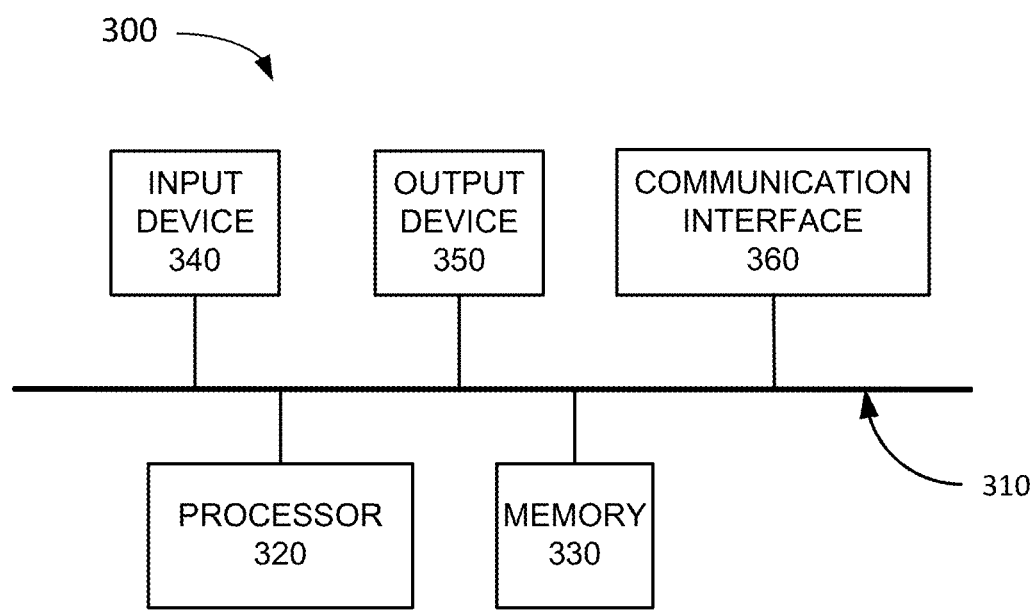
FIG. 3 is a diagram illustrating exemplary components of one or more of the devices of FIG. 2.

FIG. 3 is a diagram illustrating exemplary components of device 300 according to an implementation described herein. MTC server 150, MTC-IWF device 160, MME 230, SGW 240, PGW 250, and/or HSS 260 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a method of waking up UE 110 from a power saving mode. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
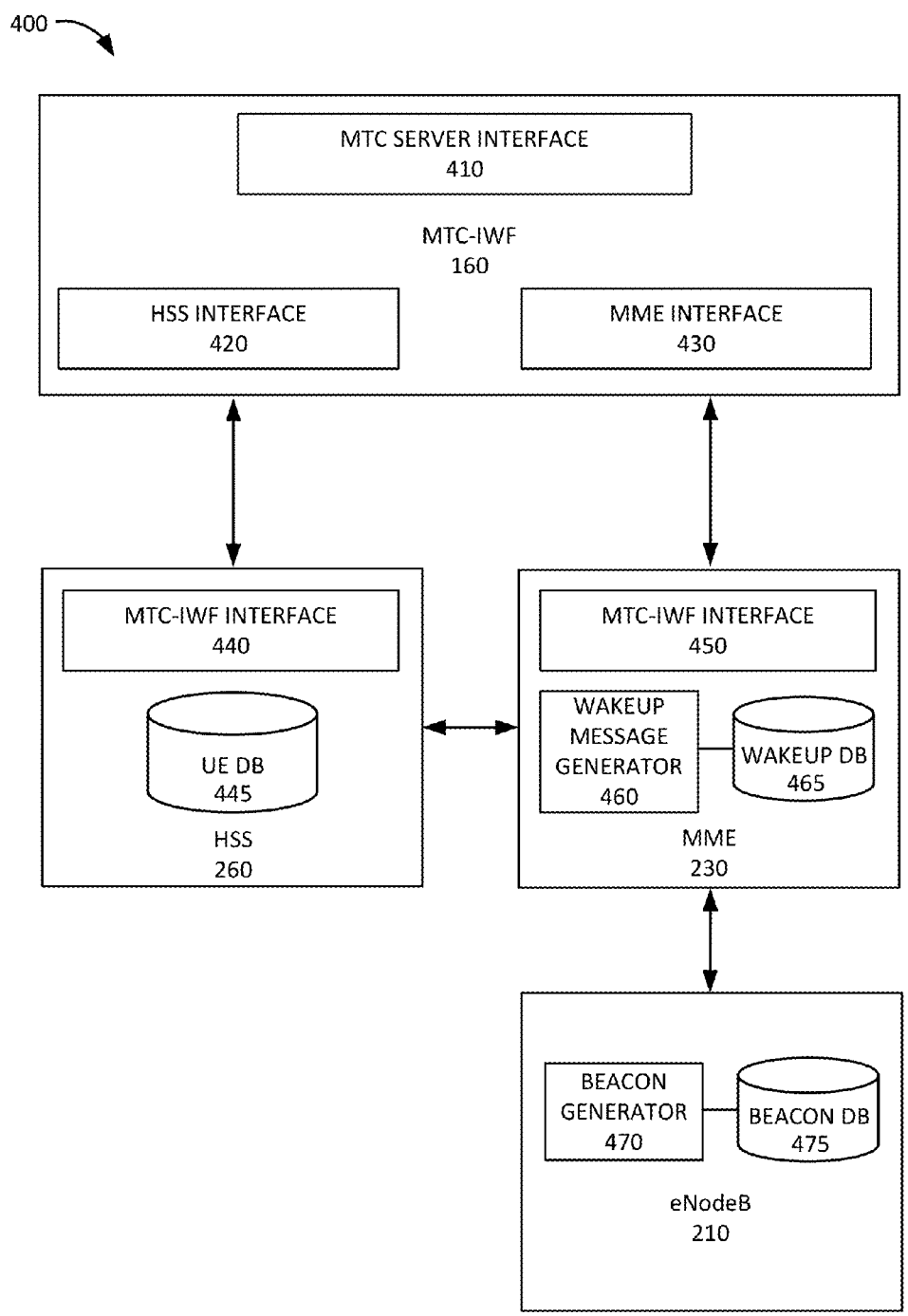
FIG. 4 is a diagram illustrating exemplary functional components of some of the devices of FIG. 2.

FIG. 4 is a diagram illustrating system 400 that includes exemplary functional components of MTC-IWF device 160, HSS 260, MME 230, and eNodeB 210. The functional components of MTC-IWF device 160, HSS 260, and/or MME 230 may be implemented, for example, via processor 320 executing instructions from memory 330, and the functional components of eNodeB 210 may be implemented, for example, via processing unit 510 executing instructions from memory 520. Alternatively, some or all of the functional components included in system 400 may be implemented via hard-wired circuitry. As shown in FIG. 4, MTC-IWF device 160 may include an MTC server interface 410, an HSS interface 420, and an MME interface 430. MTC server interface 410 may be configured to communicate with MTC server 150. MTC server interface 410 may receive a wakeup request from MTC server 150 and may forward the wakeup request to HSS interface 420. HSS interface 420 may be configured to communicate with HSS 260. HSS interface 420 may send a request to HSS 260 to determine one or more UEs 110 associated with the wakeup request and/or to determine to which MME 230 to send the wakeup request.

As shown in FIG. 4, HSS 260 may include an MTC-IWF interface 440 and a UE database (DB) 445. MTC-IWF interface 440 may be configured to communicate with MTC-IWF device 160. UE DB 445 may store UE profiles for UEs 110. MTC-IWF interface 440 may receive a wakeup request from MTC-IWF device 160 and may determine one or more UEs 110 associated with the wakeup request based on a wakeup group identifier included in the wakeup request. HSS 260 may be configured for beacon trigger service for a UE subscription group. If UE 110 is added to the subscription group, HSS 260 may add a wakeup request group identifier (ID) to a profile for UE 110. Furthermore, UE profile of UE 110 may identify a particular MME 230 associated with UE 110. Thus, MTC-IWF interface 440 may respond to the request from MTC-IWF device 160 by identifying one or more UEs 110 associated with the wakeup request, and/or may identify one or more MMEs 230 associated with the identified one or more UEs 110, based on information stored in UE profiles in UE DB 445, and may provide identified information to MTC-IWF device 1650.

MME interface 430 of MTC-IWF device 160 may be configured to communicate with MME 230. MME interface 430 may send a request to one or more MMEs 230 based on a wakeup request received from MTC server interface 410 and based on information received via HSS interface 420.

As shown in FIG. 4, MME 230 may include a MTC-IWF interface 450, a wakeup message generator 460, and a wakeup DB 465. MTC-IWF interface 450 may be configured to communicate with MTC-IWF device 160. For example, MTC-IWF interface 450 may receive a wakeup request from MTC-IWF device 160 and may forward the request to wakeup message generator 460. Wakeup message generator 460 may map the wakeup request to a signature beacon based on information stored in wakeup DB 465. Wakeup DB 465 may associate a particular wakeup request group ID, a particular trigger type ID, a particular priority ID, and/or other identifiers with a particular signature beacon ID. Wakeup message generator 460 may identify one or more eNodeBs 210 serving UEs 110 associated with the wakeup request group ID included in the received wakeup request and may instruct the identifier eNodeBs 210 to generate signature beacons associated with the mapped signature beacon ID.

As shown in FIG. 4, eNodeB 210 may include a beacon generator 470 and a beacon DB 475. Beacon generator 470 may be configured to generate a particular beacon from a set of sequences with good auto-correlation and/or cross-correlation properties. For example, beacon generator 470 may be configured to generate waveforms based on Zadoff-Chu sequences. Beacon DB 475 may associate particular signature beacon IDs with particular parameters for generating a particular signature beacon waveform. eNodeB 210 may wirelessly transmit the generated signature beacon.

Although FIG. 4 shows exemplary components of system 400, in other implementations, system 400 may include fewer components, different components, additional components, or differently arranged components than depicted in FIG. 4. Additionally or alternatively, one or more components of system 400 may perform one or more tasks described as being performed by one or more other components of system 400.

Figure 5:
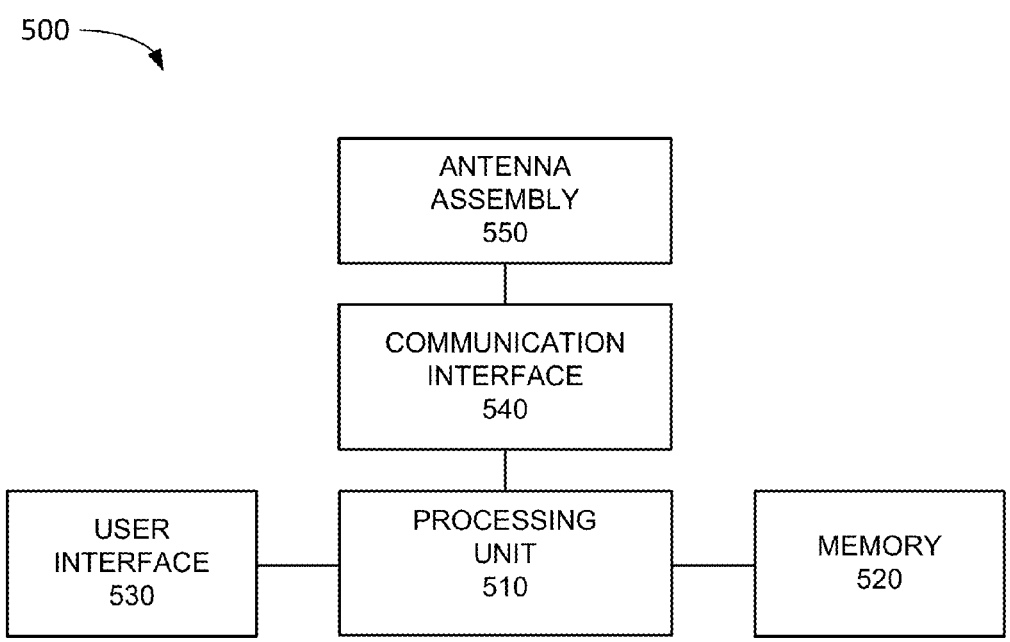
FIG. 5 is a diagram illustrating exemplary components of the user equipment or base station of FIG. 1.

FIG. 5 is a diagram illustrating example components of a device 500 according to an implementation described herein. UE 110 and/or SIM card 120 may each include one or more devices 500. As shown in FIG. 5, device 500 may include a processing unit 510, a memory 520, a user interface 530, a communication interface 540, and an antenna assembly 550.

Processing unit 510 may include one or more processors, microprocessors, application specific integrated circuits (ASICs), field programmable gate arrays (FPGAs), and/or other processing logic. Processing unit 510 may control operation of device 500 and its components.

Memory 520 may include a random access memory (RAM) or another type of dynamic storage device, a read only memory (ROM) or another type of static storage device, a removable memory card, and/or another type of memory to store data and instructions that may be used by processing unit 510.

User interface 530 may allow a user to input information to device 500 and/or to output information from device 500.

Examples of user interface 530 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 500 to vibrate; and/or any other type of input or output device.

Communication interface 540 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 540 may include a transmitter that converts baseband signals to radio frequency (RF) signals and/or a receiver that converts RF signals to baseband signals. Communication interface 540 may be coupled to antenna assembly 550 for transmitting and receiving RF signals.

Communication interface 540 may include a logical component that includes input and/or output ports, input and/or output systems, and/or other input and output components that facilitate the transmission of data to other devices. For example, communication interface 540 may include a network interface card (e.g., Ethernet card) for wired communications and/or a wireless network interface (e.g., a WiFi) card for wireless communications. Communication interface 540 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 550 may include one or more antennas to transmit and/or receive RF signals. Antenna assembly 550 may, for example, receive RF signals from communication interface 540 and transmit the signals and receive RF signals and provide them to communication interface 540.

As described herein, device 500 may perform certain operations in response to processing unit 510 executing software instructions contained in a computer-readable medium, such as memory 520. A computer-readable medium may be defined as a non-transitory memory device. A non-transitory memory device may include memory space within a single physical memory device or spread across multiple physical memory devices. The software instructions may be read into memory 520 from another computer-readable medium or from another device via communication interface 540. The software instructions contained in memory 520 may cause processing unit 510 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Additionally or alternatively, one or more components of device 500 may perform the tasks described as being performed by one or more other components of device 500.

Figure 6A:
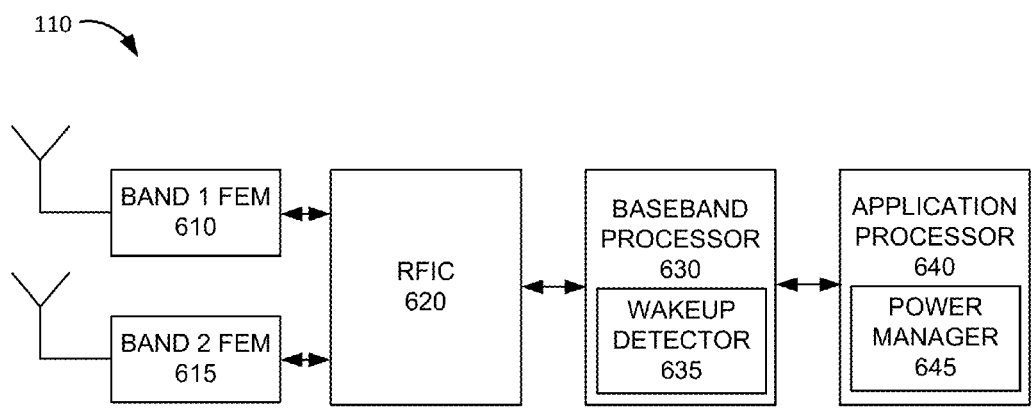
FIGS. 6A-6B are diagrams illustrating exemplary functional components of the user equipment of FIG. 1.

FIG. 6A is a diagram illustrating exemplary functional components of UE 110 according to an implementation described herein. The functional components of UE 110 may be implemented, for example, via processing unit 510 executing instructions from memory 520. Alternatively, some or all of the functional components of UE 110 may be implemented via hard-wired circuitry. As shown in FIG. 6A, UE 110 may include a band 1 front end module (FEM) 610 with a corresponding antenna and a band 2 FEM 615 with a corresponding antenna, a radio frequency integrated circuit (RFIC) 620, a baseband processor 630, and an application processor 640.

FEM 610 may process a signal received at a first incoming frequency in a first band and FEM 615 may process a signal received at a second incoming frequency in a second band. FEM 610 and FEM 615 may include, for example, an impedance matching circuit to match the input impedance of the receiving circuit to the impedance of the antenna, an amplifier to amplify received signals, and/or a mixer to mix incoming signals with signals from a local oscillator to convert the received signals to an intermediate frequency. RFIC 620 may include an integrated circuit to down convert signals from an intermediate frequency to a baseband frequency.

Baseband processor 630 may perform real-time processing on received signals, or signals which are to be transmitted, such as signal modulation/demodulation, encoding, RF shifting, error correction, and/or other types of baseband operations. Baseband processor 630 may include a wakeup detector 635. Wakeup detector 635 may monitor incoming signals for a matching wireless signature beacon. If a matching wireless signature beacon is detected, wakeup detector 635 may generate a wakeup signal and may send the wakeup signal to application processor 640. Exemplary components of wakeup detector 635 are described below with reference to FIG. 6B.

Application processor 640 may perform the main operations of UE 110. For example, application processor 640 may run an operating system and may run applications installed on UE 110. Application processor 640 may include a power manager 645. Power manager 645 may manage the power settings of UE 110. For example, power manager 645 may be configured to maximize the battery life of UE 110. Thus, when UE 110 is not performing a particular task, such as running an application or communicating with MTC server 150, power manager 645 may cause UE 110 to enter a power saving mode. The power saving mode may reduce or halt devices or processes associated with UE 110, such as for example, causing processing cores to enter an idle mode; shutting down or reducing or eliminating power flow to output devices, communication devices and/or transitory memory devices; terminating particular applications and/or process threads; and/or performing other tasks to extend the battery life of UE 110.

Power manager 645 may cause UE 110 to exit the power saving mode in response to receiving a wakeup signal from wakeup detector 635. Different signature beacons may cause wakeup detector 635 to generate different types of wakeup signals and different types of wakeup signals may cause power manager 645 to perform different actions. Thus, power manager 645 may map particular wakeup signals to a particular sets of actions. For example, power manager 645 may perform a wakeup process to exit the power saving mode immediately, to exit the power saving mode at a scheduled time in the future, to attach or re-attach to a access network 130, to contact MTC server device 150 to request instructions and/or updates, to send a particular piece of information to MTC server device 150, and/or perform another type of action.

Figure 6B:
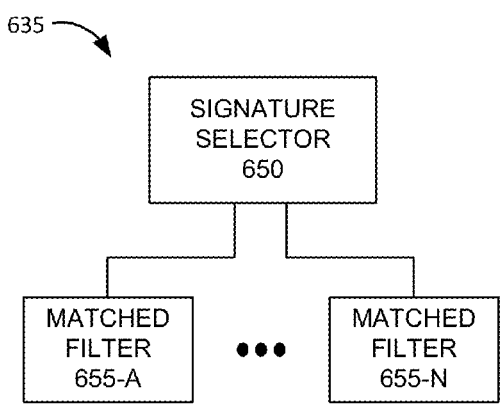

FIG. 6B shows exemplary components of wakeup detector 635 of FIG. 6A. As shown in FIG. 6B, wakeup detector 635 may include a signature selector 650 and a set of matched filters 655-A to 655-N. Signature selector 650 may select a particular one of matched filters 655 and may activate the selected matched filter 655.

Matched filter 655 may correspond to a linear filter that correlates a template signal waveform with a received signal to detect the presence of the template signal waveform in the received signal. If the template signal waveform is present in the received signal, matched filter 655 may generate an output impulse signal. Each matched filter 655 may be configured to detect a particular signature beacon. For example, each matched filter 655 may be configured to detect a signal waveform from a set of sequences with good auto-correlation and/or cross-correlation properties, such as a particular Zadoff-Chu sequence, a particular M sequence, and/or another type of sequence. An exemplary waveform sequence is described below with reference to FIG. 7B.

A particular one of matched filters 655 may be active at a particular time, based on which matched filter 655 is assigned to UE 110 by (e.g., MTC server 150, a user via user interface 530, etc.), and consequently selected by signature selector 650. For example, in some implementations, signature selector 650 may direct signals received by baseband processor 630 to the selected matched filter 655. In other implementations, signals may be directed to multiple matched filters 655 and coefficients for a weighted sum of outputs of matched filters 655 may be selected based on the selected matched filter. For example, the output of wakeup detector 635 may be based on an equation $y(n)=a_1*x(1)+ \ldots +a_n*x(n)$, where $a_u$ represents the coefficient for matched filter u, where x(u) represents the output of matched filter u, and where n represents the number of matched filters. In yet other implementations, multiple matched filters 655 may be selected for different trigger types, different priorities, etc.

Although FIGS. 6A and 6B show exemplary functional components of UE 110, in other implementations, UE 110 may include fewer functional components, different functional components, differently arranged functional components, or additional functional components than depicted in FIGS. 6A and 6B. Additionally or alternatively, one or more functional components of UE 110 may perform functions described as being performed by one or more other functional components of UE 110.

Figure 7A:
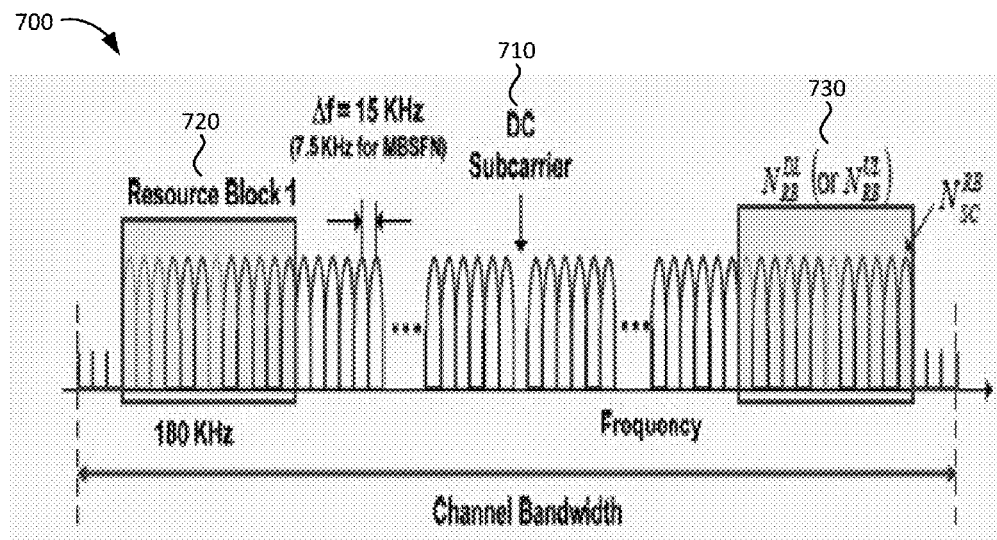
FIG. 7A is a diagram of an exemplary channel according to an implementation described herein.

FIG. 7A is a diagram of an exemplary channel 700 according to an implementation described herein. As shown in FIG. 7A, channel 700 may correspond to an Orthogonal Frequency Division Multiplexing (OFDM) channel that is divided into multiple subcarriers that carry information. Channel 700 may include a DC subcarrier 710 and data subcarriers 720 and 730. Though channel 700 may include a larger number of data subcarriers, only subcarriers 720 and 730 are shown in FIG. 7A for illustrative purposes. DC subcarrier 710 may include a frequency range corresponding to the RF center frequency of the transmitted signal. Thus, DC subcarrier 710 may correspond to the zero frequency (i.e., direct current) of the unmodulated Fast Fourier Transform (FFT) signal of the transmission. Because the DC subcarrier may experience a high level of noise, DC subcarrier 710 may be designated to not carry any data (e.g., resource blocks) in an LTE wireless communication. Thus, DC subcarrier 710 may be available to carry a signature beacon to wake up UE 110 in a power saving mode. The signature beacon waveform may be of a short duration and transmitted repeatedly and may thus not be affected by a higher signal-to-noise (SNR) ratio experienced by DC subcarrier 710.

Figure 7B:
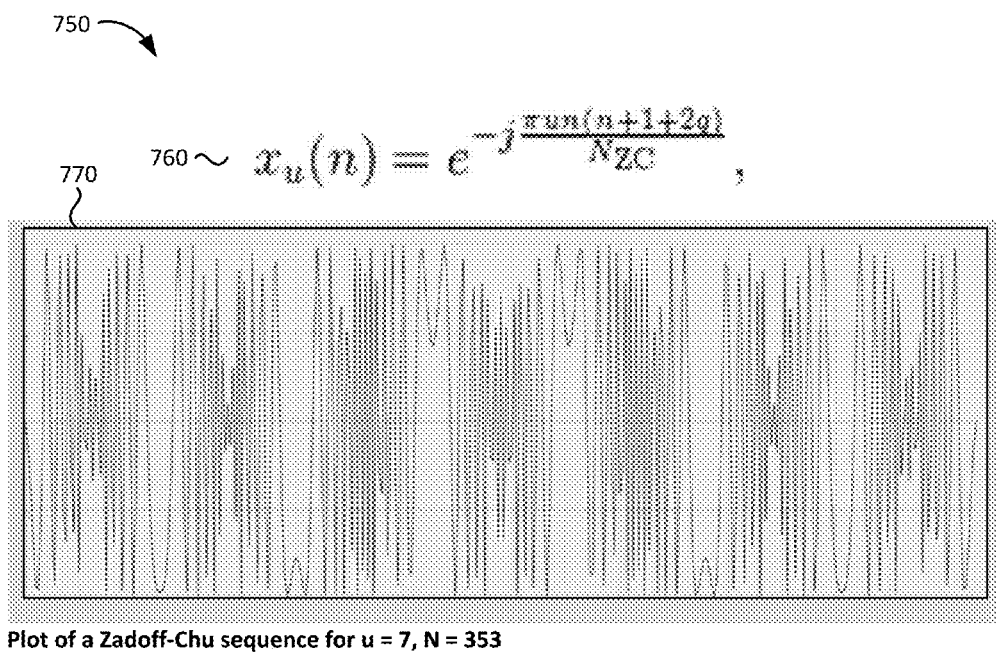
FIG. 7B is a diagram of an exemplary signature beacon according to an implementation described herein.

FIG. 7B is a diagram of an exemplary signature beacon waveform 750 according to an implementation described herein. As shown in FIG. 7B, signature beacon waveform 750 of amplitude over time may be based on a Zadoff-Chu sequence 760. In Zadoff-Chu sequence 760, the complex value at each position n of a root parametrized by u is defined by equation:

$$x_u(n) = e^{-j\frac{\pi un(n+1+2q)}{N_{ZC}}}$$

wherein q corresponds to an integer constant, $N_{ZC}$ corresponds to a constant that represents the length of the sequence, and wherein n is a value between 0 and $N_{ZC}$. A Zadoff-Chu sequence, when applied to a radio signal, may generate a signal of a constant amplitude with cyclically shifted versions resulting in zero correlation with one another. An exemplary waveform 770 for a Zadoff-Chu sequence with u=7 and N=353 is shown in FIG. 7B.

Figure 8:
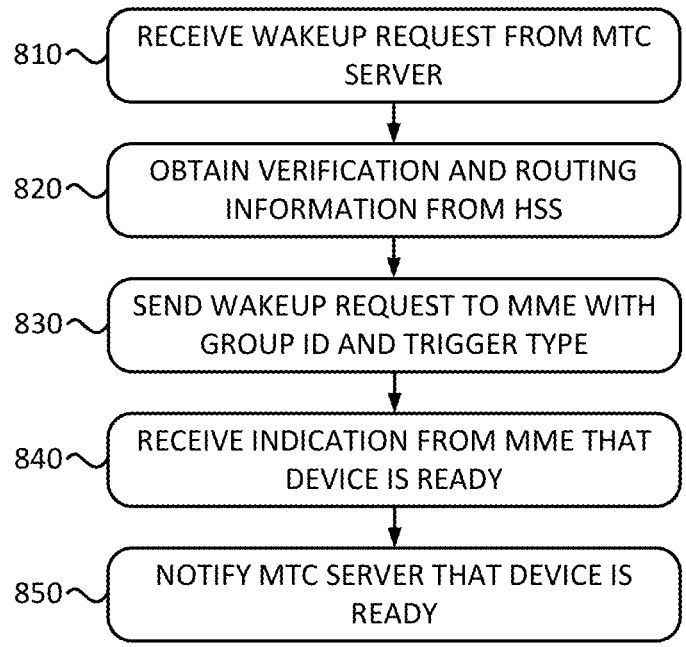
FIG. 8 is a flowchart of an exemplary process performed by a machine type communication interworking function (MTC-IWF) device according to an implementation described herein.

FIG. 8 is a flowchart of an exemplary process performed by MTC-IWF device 160 according to an implementation described herein. In some implementations, the process of FIG. 8 may be performed by MTC-IWF device 160. In other implementations, some or all of the process of FIG. 8 may be performed by another device or a group of devices separate from MTC-IWF device 160 or including MTC-IWF device 160.

The process of FIG. 8 may include receiving a wakeup request from an MTC server (block 810). For example, MTC-IWF 160 may receive a request from MTC server 150 to wake up a device or a group of devices associated with MTC server 150. The request may include a wakeup group ID and additional information, such as a trigger type, a priority type, and/or other types of information. Verification and routing information may be obtained from an HSS device (block 820). For example, MTC-IWF device 160 may send a request to HSS 260 to authenticate MTC server 150 and to determine which UEs 110 are subscribed to the wakeup group ID and which MMEs 230 are associated with the UEs 110. MTC-IWF device 160 may receive a response from HSS 260 that includes the requested information.

A wakeup request to one or more MMEs may be sent with the group ID and the trigger type (block 830). For example, MTC-IWF device 160 may send a wakeup request to one or more MMEs 230 associated with the identified UEs 110 subscribed to the wakeup group ID. The wakeup request may include the wakeup group ID, a trigger type identifying a type of wakeup event, and/or other information, such as, for example, a priority type associated with the wakeup request.

An indication may be received from an MME that a device is ready (block 840) and the MTC server may be notified that the device is ready (block 850). For example, MTC-IWF device 160 may receive an indication from MME 230 that a UE 110 has woken up and/or that the UE 110 has attached or re-attached to access network 130 and that UE 110 is ready to communicate with MTC server 150. MTC-IWF device 160 may send an indication to MTC server 150 that UE 110 is ready to communicate with MTC server 150.

Figure 9:
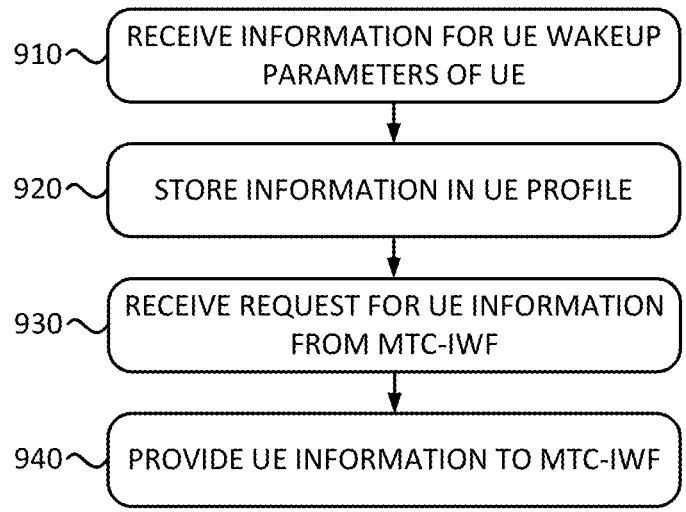
FIG. 9 is a flowchart of an exemplary process performed by a Home Subscriber Server (HSS) according to an implementation described herein.

FIG. 9 is a flowchart of an exemplary process performed by HSS 260 according to an implementation described herein. In some implementations, the process of FIG. 9 may be performed by HSS 260. In other implementations, some or all of the process of FIG. 9 may be performed by another device or a group of devices separate from HSS 260 or including HSS 260.

The process of FIG. 9 may include receiving information for UE wakeup parameters of a UE (block 910) and may store the received information in a UE profile (block 920). For example, UE 110 may subscribe to a particular wakeup group. The subscription request may be received from UE 110, from MTC server 150, and/or from another device. In response, HSS 260 may update UE record for UE 110 to include a wakeup signature beacon trigger service and may identify UE 110 as being a member of the wakeup group by including the wakeup group ID in the UE profile. Moreover, HSS 260 may associate MTC server 150 with UE 110 by including information identifying MTC server 150, and/or authentication information for MTC server 150, in UE DB 445. For example, UE DB 445 may include wakeup group records for each wakeup group ID and a wakeup group record may include information identifying MTC server 150 and/or authentication information for MTC server 150. Furthermore, HSS 260 may maintain information relating to which particular MME 230 is servicing UE 110.

A request for UE information may be received from an MTC-IWF device (block 930) and the UE information may be provided to the MTC-IWF device (block 940). For example, HSS 260 may receive a request from MTC-IWF device 260 to authenticate MTC server 150 and to provide information identifying UEs 110 associated with a wakeup group ID, as well as information identifying MMEs 230 serving the identified UEs 110. HSS 260 may access UE DB 445 to obtain the requested information and may provide the requested information to MTC-IWF device 260.

Figure 10:
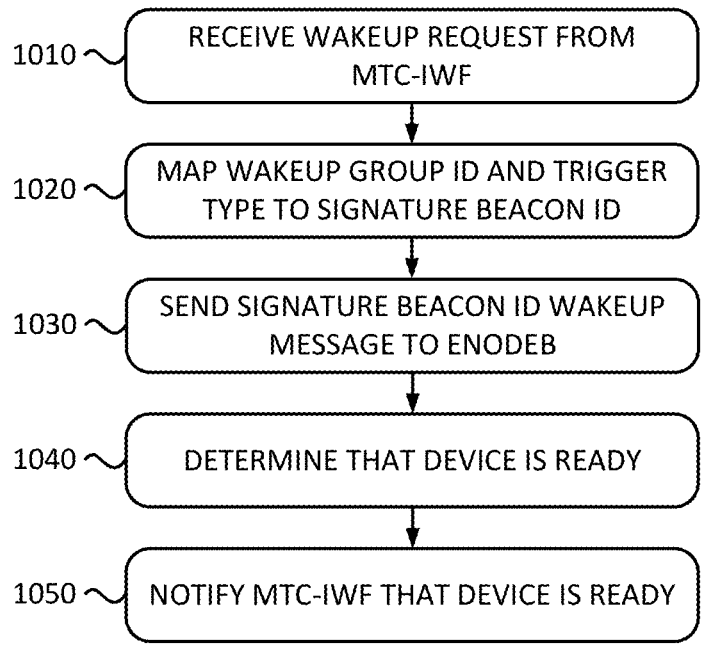
FIG. 10 is a flowchart of an exemplary process performed by a Mobility Management Entity (MME) according to an implementation described herein.

FIG. 10 is a flowchart of an exemplary process performed by MME 230 according to an implementation described herein. In some implementations, the process of FIG. 10 may be performed by MME 230. In other implementations, some or all of the process of FIG. 10 may be performed by another device or a group of devices separate from MME 230 or including MME 230.

The process of FIG. 10 may include receiving a wakeup request from a MTC-IWF device (block 1010), mapping a wakeup group ID and trigger type to a signature beacon ID (block 1020) and sending a signature beacon ID wakeup message to an eNodeB (block 1030). For example, MME 230 may receive a wakeup request from MTC-IWF device to generate a wakeup message. The request may include a wakeup group ID, a trigger type ID (and/or other types of IDs, such as a priority ID), and a list of UEs 110 associated with the wakeup group ID that MTC-IWF device 160 obtained from HSS 260. Wakeup message generator 460 of MME 230 may access wakeup DB 465 and may map the wakeup group ID and the trigger type ID to a particular signature beacon ID. Thus, for example, a wakeup group ID may be associated with different signature beacon IDs for different trigger types, for different priority types, and/or for different values of other types of identifiers. MME 230 may identify all eNodeBs 210 that are serving the identified UEs 110 to which the wakeup request is to be sent and may send a wakeup request to each eNodeB 210 to generate a signature beacon associated with the identified signature beacon ID.

A determination may be made that the device is ready (block 1040) and the MTC-IWF device may be notified that the device is ready (block 1050). At a later time, MME 230 may determine that UE 110 has woken up and is ready to communicate with MTC server 150. MME 230 may determine that UE 110 is ready based on UE 110 re-attaching to access network 130 and/or based on receiving an indication from eNodeB 210 that UE 110 has exited a power saving mode and has communicated with eNodeB 210.

Figure 11:
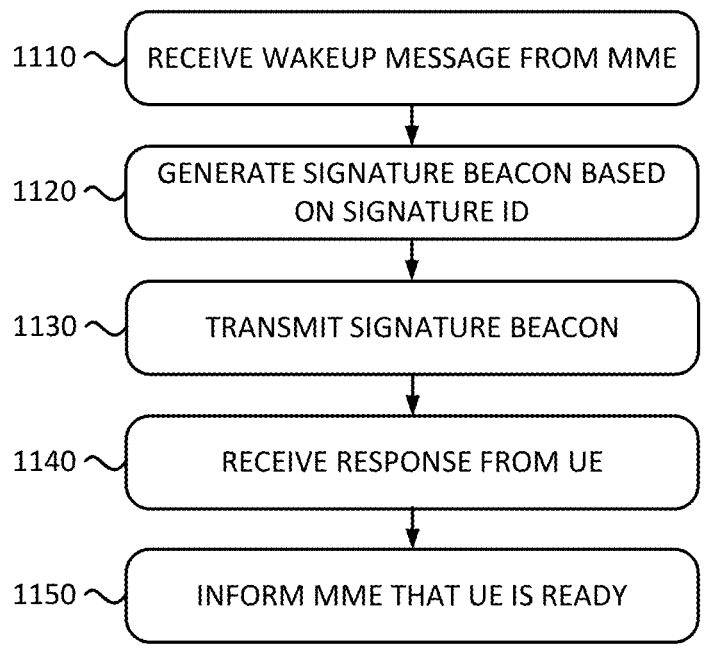
FIG. 11 is a flowchart of an exemplary process performed by an eNodeB according to an implementation described herein.

FIG. 11 is a flowchart of an exemplary process performed by eNodeB 210 according to an implementation described herein. In some implementations, the process of FIG. 11 may be performed by eNodeB 210. In other implementations, some or all of the process of FIG. 11 may be performed by another device or a group of devices separate from eNodeB 210 or including eNodeB 210.

The process of FIG. 11 may include receiving a wakeup message from an MME (block 1110), generating a signature beacon based on a signature ID (block 1120), and transmitting the signature beacon (block 1130). For example, beacon generator 470 may receive a request from MME 230 to generate a signature beacon for a signature beacon ID. Beacon generator 470 may access beacon DB 475 to identify a particular signature beacon generator circuit and may activate the identified signature beacon generator circuit to generate and transmit the particular signature beacon. For example, beacon generator 470 may activate a circuit that generates a particular Zadoff-Chu waveform.

A response may be received from a UE (block 1140) and MME may be informed that the UE is ready (block 1150). For example, once UE 110 wake up, UE 110 may contact eNodeB 210 to attach or re-attach to access network 130. In response, eNodeB 210 may inform MME 230 that UE 110 is ready for communicating with MTC server 150.

Figure 12:
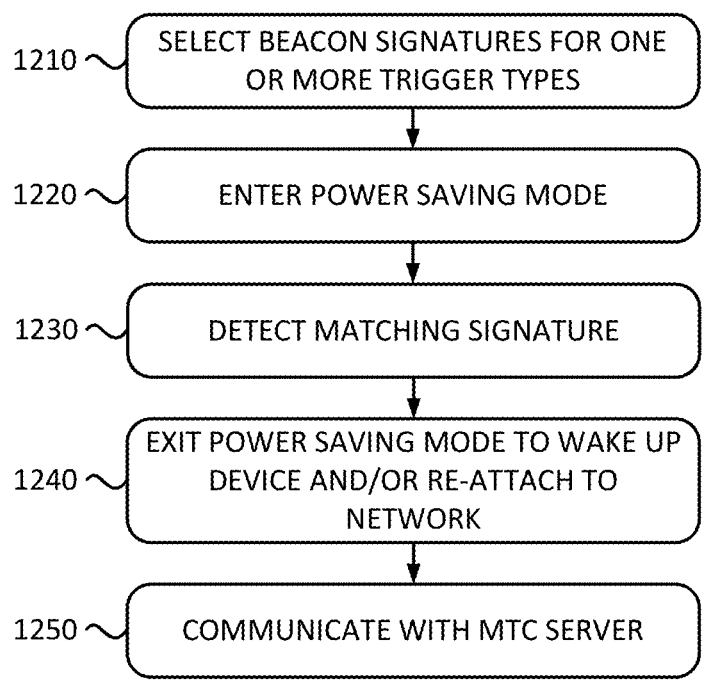
FIG. 12 is a flowchart of an exemplary process performed by user equipment according to an implementation described herein.

FIG. 12 is a flowchart of an exemplary process performed by UE 110 according to an implementation described herein. In some implementations, the process of FIG. 12 may be performed by UE 110. In other implementations, some or all of the process of FIG. 12 may be performed by another device or a group of devices separate from UE 110 or including UE 110.

The process of FIG. 12 may include selecting beacon signatures for one or more trigger types (block 1210). Wakeup detector 635 may be configured to activate one or more matched filters 655 that are selected for one or more trigger types. For example, wakeup detector 635 may select to activate a particular matched filter 655 for each different trigger type for which UE 110 is configured. Wakeup detector 635 may be configured during manufacture of baseband processor 630, during activation of a SIM card installed in UE 110, manually by a user, by communicating with MTC server 150, and/or using another technique. Thus, for example, MTC server 150 may assign a particular matched filter 655 to UE 110 and wakeup detector 635 may select to activate the particular matched filter 655 based on an instruction received from MTC server 150. As another example, a user may assign a particular matched filter 655 to UE 110 via user interface 530 and wakeup detector 635 may select to activate the particular matched filter 655 based on an instruction received via user interface 530.

Once one or more beacon signatures have been initialized and UE 110 finishes performing any operations requiring a waking state, UE 110 may enter a power saving mode (block 1220). For example, power manager 645 may cause one or more processing cores to enter an idle mode, may shut down or reduce power flow to output devices, sensor devices, communication devices and/or transitory memory devices, may terminate particular applications and/or process threads, and/or may perform other tasks to extend the battery life of UE 110. Furthermore, power manager 645 may set a power saving mode flag to indicate that UE 110 is in a power saving mode.

A matching signature may be detected (block 1230) and the power saving mode may be exited to wake up the device and/or to re-attach to a network (block 1240). For example, baseband processor 630 may receive a wireless signal that causes one of the activated matched filters 655 to generate an output greater than a wakeup threshold. Wakeup detector 635 may generate a wakeup signal based on the output of the activated matched filter 655. Power manager 645 may map the wakeup signal to a particular set of actions, such as exiting the power saving mode immediately, exiting the power saving mode at a particular time in the future, or exiting the power saving mode in response to a particular condition, such as a wireless signal strength above a signal strength threshold, a particular sensor generating a signal above a signal threshold, and/or another type of condition. Furthermore, power manager 645 may instruct UE 110 to perform one or more additional actions, such as attaching to access network 130, contacting MTC server 150 to request instructions, reporting a particular metric or another type of information to MTC server 150, etc.

Communication with the MTC server may take place (block 1250). For example, MTC server 150 may be informed by access network 130 that UE 110 has woken up and is ready and may send instructions to UE 110 to report information, receive instructions to perform a particular action, perform an update, and/or to otherwise communicate with UE 110.

Figure 13:
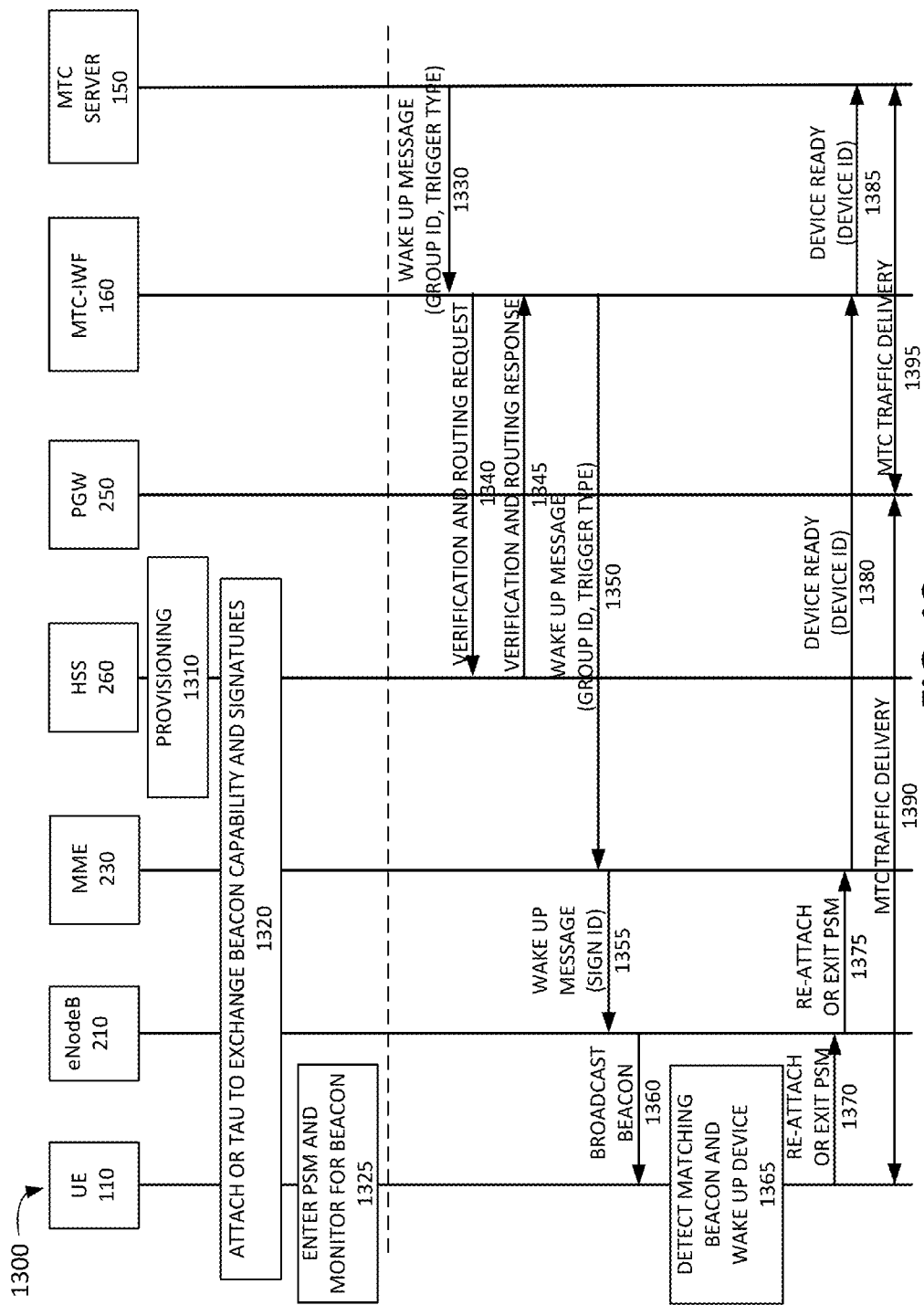
FIG. 13 is an exemplary signal flow diagram according to an implementation described herein.

FIG. 13 is an exemplary signal flow diagram 1300 according to an implementation described herein. As shown in FIG. 13, signal flow diagram 1300 may include provisioning (block 1310) and attaching or performing a tracking area update (TAU) to exchange beacon capability and signatures (block 1320). For example, HSS 260 may receive a subscription request on behalf of UE 110 to add UE 110 to a particular wakeup group. Furthermore, UE 110 may be programmed to select one or more signature beacons once UE attaches to access network 130 or when a TAU is performed between UE 110 and MME 230. In other implementations, UE 110 may be programmed locally by a technician or user via an input device associated with UE 110 or via a wired connection between UE 110 and another device. UE 110 may then enter power saving mode (PSM) and may monitor for the selected one or more signature beacons (block 1325).

At a later time, MTC server 150 may select to wake up UE 110 and may send a wake up request to MTC-IWF device 160 (signal 1330). The wake up request may include a group ID and a trigger ID (as well as additional IDs, such as a priority ID). MTC-IWF device 160 may send a verification and a routing request to HSS 260 (signal 1340) to determine UEs 110 and MMEs 230 to which the wakeup request should be sent. HSS 260 may verify MTC server 150, may access UE DB 445 to identify UEs 110 subscribed to the group ID and to identify MMEs 230 that are serving the identified UEs 110, and may respond to the request by providing the request information to MTC-IWF device 160 (signal 1345).

MTC-IWF device 160 may send a wakeup message to the identified one or more MMEs 230 (signal 1350). The wakeup message may include the group ID and the trigger type ID. Furthermore, the wakeup message may identify UEs 110 associated with the group ID and obtained from HSS 260. MME 230 may map the wake up request group ID and trigger type ID to a signature beacon ID and may determine eNodeBs 210 associated with the identified UEs

110. MME 230 may then send a wakeup message with the signature beacon ID to the identified eNodeBs 210 (signal 1355). eNodeB 210 may receive the wakeup message and may generate a signature beacon based on the signature beacon ID (signal 1360).

UE 110 may detect the matching signature beacon and may wake up the device (block 1365). UE 110 may re-attach to access network 130 via eNodeB 210 and MME 230 (signals 1370 and 1375) and MME 230 may inform MTC-IWF device 260 that UE 110 is ready (signal 1380). The message from MME 230 to MTC-IWF device 160 may include information identifying UE 110, such as a telephone number or another identifier associated with UE 110. MTC-IWF device 160 may forward the indication that UE 110 is ready to MTC server 150 (signal 1385). In response, MTC server 150 may begin communicating with UE 110 by, for example, delivering MTC traffic to UE 110 (signals 1390 and 1395).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 8-12, and series of signal flows have been described with respect to FIG. 13, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a wireless communication device, the method comprising:
selecting, by the wireless communication device, a wakeup signature beacon signal, wherein selecting the wakeup signature beacon signal includes:
activating a particular matched filter circuit from a plurality of matched filter circuits that are included in the wireless communication device, wherein the particular matched filter circuit correlates a template signal waveform with a received signal and generates an output impulse signal if the received signal matches the template signal waveform, and wherein activating the particular matched filter circuit includes directing signals received by a baseband processor to the particular matched filter circuit and not directing the signals to non-activated ones of the plurality of matched filter circuits;
receiving, by the wireless communication device, a wireless signature beacon signal;
detecting the output impulse signal from the particular matched filter circuit, in response to receiving the wireless signature beacon signal;
determining a trigger type for waking up the wireless communication device based on the received wireless signature beacon signal;
selecting a wakeup process based on the determined trigger type, wherein the selected wakeup process includes at least one of:
exiting the power saving mode immediately;
exiting the power saving mode at a scheduled time in the future;
attaching to a wireless access network;
contacting a server device to request instructions; or
reporting a particular metric to the server device; and
performing, by the wireless communication device, the selected wakeup process, in response to detecting the output impulse signal from the particular matched filter circuit.

2. The method of claim 1, wherein the wireless signature beacon signal is received via a direct current (DC) subcarrier of a wireless frequency band, wherein the wireless communication device is configured to receive transmission signals via the wireless frequency band.

3. The method of claim 1, wherein the received wireless signature beacon signal includes a constant amplitude zero autocorrelation waveform.

4. The method of claim 3, wherein the constant amplitude zero autocorrelation waveform includes a Zadoff-Chu sequence.

5. The method of claim 1, further comprising:
establishing a communication session with a server device, in response to performing the wakeup process.

6. The method of claim 1, wherein the particular matched filter circuit includes multiple matched filter circuits and wherein the generated output impulse signal is based on a weighted sum of outputs from the multiple matched filter circuits.

7. The method of claim 1, wherein the particular matched filter circuit includes multiple matched filter circuits and wherein each of the multiple matched filter circuits is associated with a different trigger type for waking up the wireless communication device.

8. A wireless communication device comprising:
a baseband processing unit comprising:
a wakeup detector configured to:
activate a particular matched filter circuit from a plurality of matched filter circuits that are included in the wireless communication device, wherein the particular matched filter circuit correlates a template signal waveform with a received signal and generates an output impulse signal if the received signal matches the template signal waveform, and wherein activating the particular matched filter circuit includes directing signals received by a baseband processor to the particular matched filter circuit and not directing the signals to non-activated ones of the plurality of matched filter circuits;
receive a wireless signature beacon signal; and
detect the output impulse signal from the particular matched filter circuit, in response to receiving the wireless signature beacon signal; and
determine a trigger type for waking up the wireless communication device based on the received wireless signature beacon signal;
select a wakeup process based on the determined trigger type, wherein the selected wakeup process causes the wireless communication device to at least one of:
exit the power saving mode immediately;
exit the power saving mode at a scheduled time in the future;
attach to a wireless access network;
contact a server device to request instructions; or
report a particular metric to the server device; and
generate a wake up signal, in response to detecting the output impulse signal from the particular matched filter circuit; and
an application processing unit comprising:
a power manager configured to:
cause the wireless communication device to enter a power saving mode;
receive the wake up signal from the wakeup detector; and
perform the selected wakeup process, in response to receiving the wakeup signal.

9. The wireless communication device of claim 8, wherein the particular matched filter circuit is configured to detect a constant amplitude zero autocorrelation waveform.

10. The wireless communication device of claim 8, wherein the wireless signature beacon signal is received via a direct current (DC) subcarrier of a wireless frequency band, and wherein the wireless communication device is configured to receive transmission signals via the wireless frequency band.

11. The wireless communication device of claim 8, wherein the particular matched filter circuit includes multiple matched filter circuits and wherein the generated output impulse signal is based on a weighted sum of outputs from the multiple matched filter circuits.

12. The wireless communication device of claim 8, wherein the particular matched filter circuit includes multiple matched filter circuits and wherein each of the multiple matched filter circuits is associated with a different trigger type for waking up the wireless communication device.

13. A wireless access network system comprising:
a plurality of devices configured to:
receive a wakeup request from a machine-type communication interworking function (MTC-IWF) device;
identify a wakeup group associated with the received wakeup request;
access a wakeup database to identify a wakeup signature beacon signal associated with the identified wakeup group, wherein the identified wakeup signature beacon signal includes a constant amplitude zero autocorrelation waveform;
map the received wakeup request to the identified wakeup signature beacon signal;
generate the wakeup signature beacon signal; and
transmit the generated wakeup signature beacon signal, wherein the plurality of devices include:
a Mobility Management Entity device configured to:
map the received wakeup request to the identified wakeup signature beacon signal based on the identified wakeup group; and
instruct an eNodeB device to generate the wakeup signature beacon signal; and
an eNodeB device configured to:
generate the wakeup signature beacon signal; and
transmit the generated wakeup signature beacon signal.

14. The wireless access network system of claim 10, wherein the plurality of devices include:
a Home Subscriber Server device configured to:
store a profile for a wireless communication device that includes a wakeup group identifier associated with the wakeup group; and
identify the wireless communication device based on the received wakeup request including the wakeup group identifier.

* * * * *